United States Patent [19]

Tachihara

[11] 4,345,821

[45] Aug. 24, 1982

[54] ZOOM LENS

[75] Inventor: Satoru Tachihara, Wako, Japan

[73] Assignee: Asahi Kogaku Kogyo Kabushiki Kaisha, Tokyo, Japan

[21] Appl. No.: 193,492

[22] Filed: Oct. 3, 1980

[30] Foreign Application Priority Data

Oct. 12, 1979 [JP] Japan .................. 54-131526

[51] Int. Cl.³ .......................... G02B 15/16
[52] U.S. Cl. .................................. 350/427
[58] Field of Search ........................ 350/427

[56] References Cited

U.S. PATENT DOCUMENTS

| Re. 28,591 | 10/1975 | Nakamura | 350/427 |
| 3,615,125 | 10/1971 | Higuchi et al. | 350/427 |
| 4,094,586 | 6/1978 | Sato et al. | 350/427 |
| 4,110,006 | 8/1978 | Ikemori | 350/427 |

FOREIGN PATENT DOCUMENTS 2817633  11/1978  Fed. Rep. of Germany ...... 350/427

Primary Examiner—John K. Corbin
Assistant Examiner—Scott J. Sugarman
Attorney, Agent, or Firm—Sughrue, Mion, Zinn, Macpeak & Seas

[57] ABSTRACT

A zoom lens for use with an SLR camera the focal length of which is approximately 400 mm at a telephoto end, which has a zoom ratio of two or more, substantially the same brightness as a fixed focus lens, and substantially the same performance and compactness as a fixed focus lens. The zoom lens system includes, in order from the object side, a first zoom lens having a positive refractive power, a second lens group having a negative refractive power, a third lens group having a positive refractive power and a fourth lens group having a negative refractive power. The second lens group is movable along the optical axis to vary the focal length of the composite zoom lens system while at the same time the third lens group is movable along the optical axis to maintain the image position constant. The fourth lens group is composed, in order from the object, of a negative lens, a positive lens, at least one negative lens, and at least one positive lens.

2 Claims, 8 Drawing Figures

ZOOM LENS

BACKGROUND OF THE INVENTION

The present invention relates to a zoom lens, particularly a zoom lens intended for use with 35 mm SLR cameras, the focal length of which is approximate 400 mm at a telephoto end, which has a zoom ratio of two or more, substantially the same brightness as a fixed focus lens, and substantially the same performance and compactness as a fixed focus lens.

To date, there have not been many zoom lenses available having telephoto end focal lengths of approximately 400 mm for use with 35 mm cameras. The primary reason for this is that while a lens having a focal length of 400 mm requires a relatively large aperture ratio, compactness is also required so that the lens may be manually operated without photographic support means such as a tripod.

In general, in a lens of this type, if the overall length is decreased, the chromatic aberration (secondary spectrum) is increased and at the same time, due to the decrease of the Petzval's sum, curvature of field and astigmatism are increased resulting in a deterioration in performance. In case of super-telephoto lenses have a focal length of 800 or 1000 mm, the F-number of the lens is generally large. That is, the lenses pass sufficiently small quantities of light such that the image curvature distortion and astigmatism can be covered by the depth of focus to thereby facilitate miniaturization. However, since a relatively large aperture ratio is required for 400 mm lenses, it is difficult to miniaturize the lenses. This tendency is more remarkable in zoom lenses in which a telephoto end focal length is approximately 400 mm. It is very difficult to construct a zoom lens having a large aperture ratio and which is compact and exhibits good performance over the entire zoom range.

SUMMARY OF THE INVENTION

According to the present invention, a very compact zoom lens having a high performance over the full zoom range in spite of a relatively large aperture ratio is provided by utilization of a fixed focus telephoto lens at a zoom lens telephoto end focal length of approximately 400 mm.

A zoom lens system of the present invention comprises, in order from the object side, a first zoom lens having a positive refractive power, a second lens group having a negative refractive power, a third lens group having a positive refractive power and a fourth lens group having a negative refractive power, wherein the second lens group is movable along the optical axis to thereby vary the focal length of the zoom system and the third lens group is movable along the optical axis to thereby maintain the image position constant, and the fourth lens group is composed, in order from the object side, of a negative lens, a positive lens, at least one negative lens, and at least one positive lens.

DESCRIPTION OF THE PREFERRED EMBODIMENTS

Figure 1:
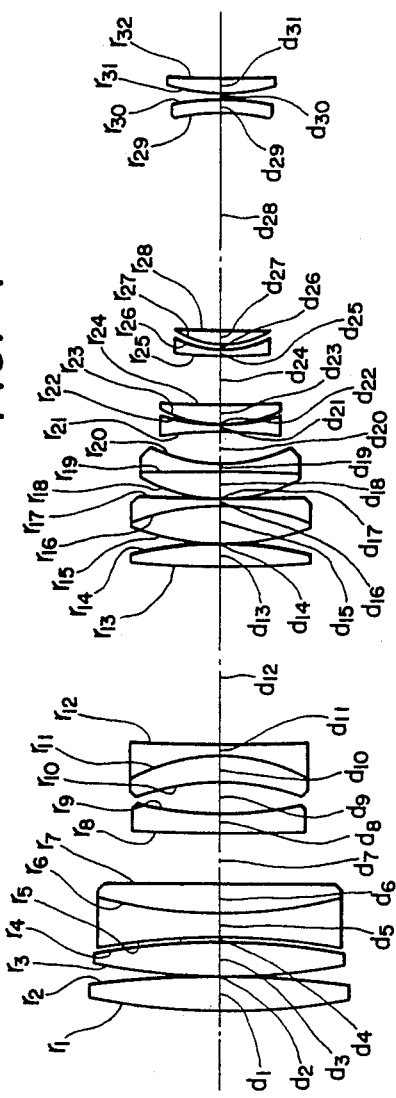
FIGS. 1 and 2 are cross-sectional views of lenses corresponding to Examples 1 and 2 described below, respectively.
Figure 2:
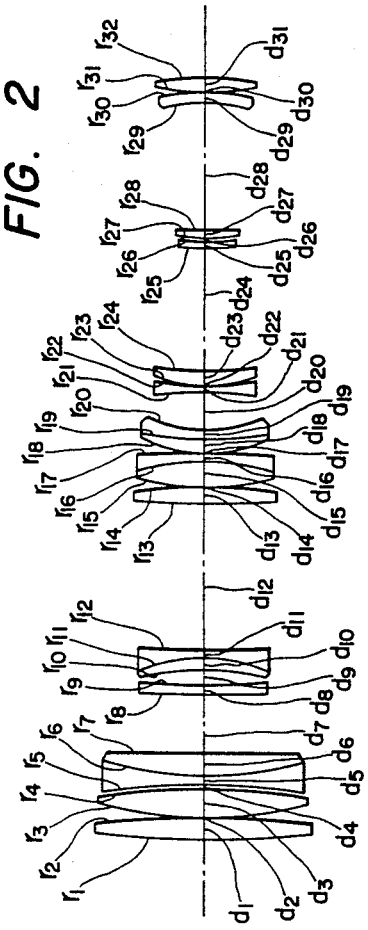
Figure 3A:
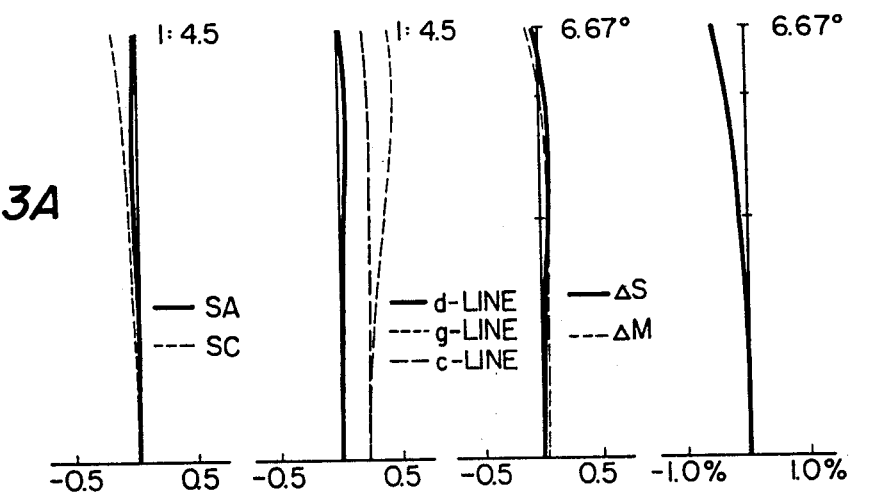
FIGS. 3a-c and 4a-c are graphs showing various aberration curves for Examples 1 and 2, respectively, where a is the minimum focal length, b at the median focal length and c at the maximum focal length.
Figure 3B:
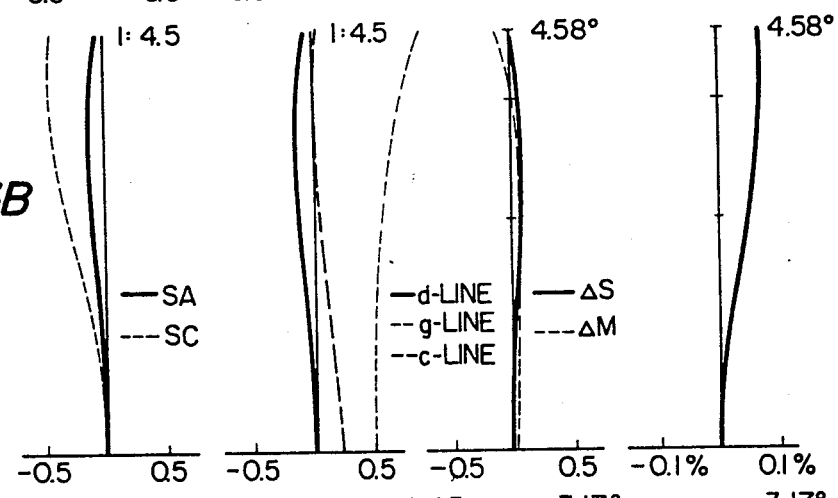
Figure 3C:
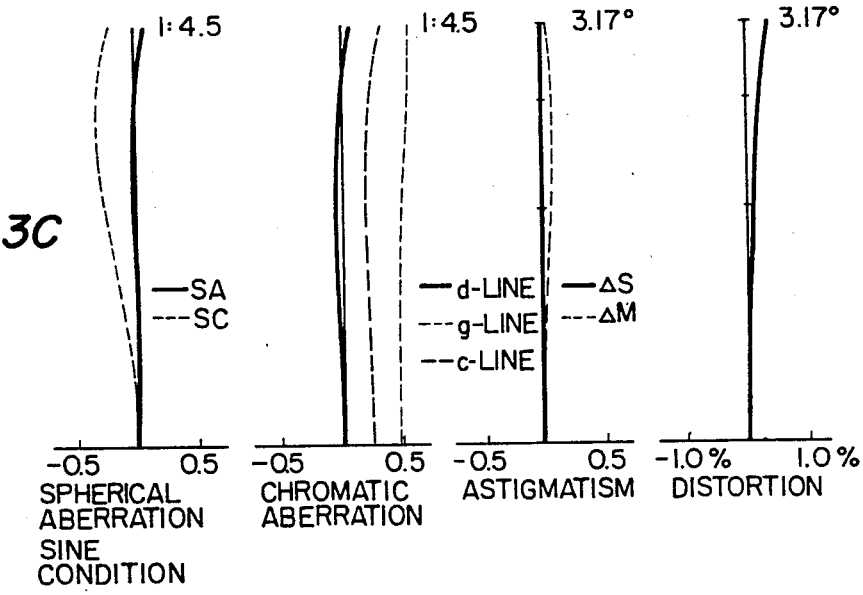
Figure 4A:
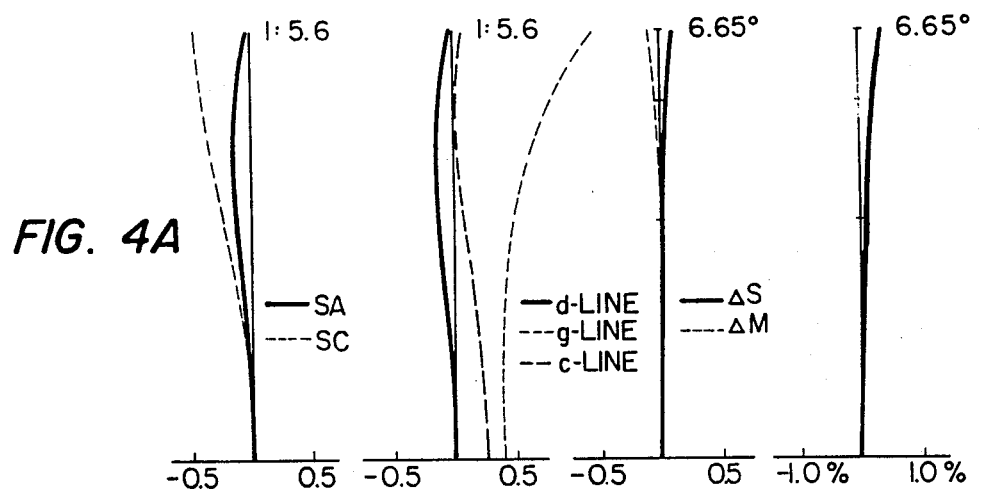
Figure 4B:
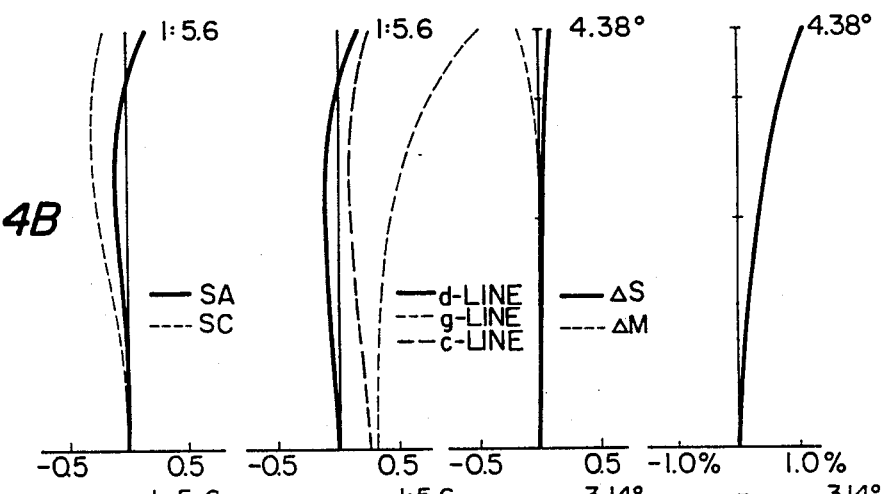
Figure 4C:
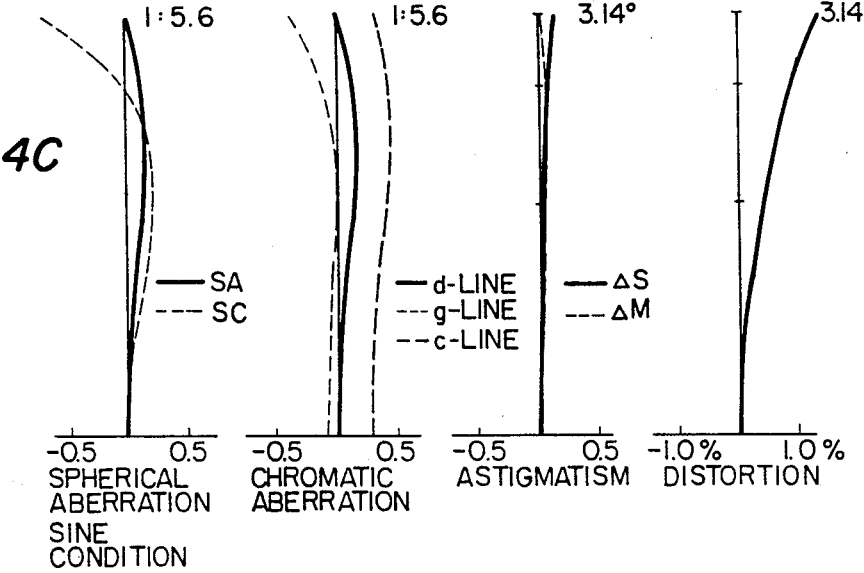

According to the present invention, a zoom lens is provided including, in order from the object side, a first lens group having a positive refractive power, a second lens group having a negative refractive power, a third lens group having a positive refractive power and a fourth lens group having a negative refractive power. The second lens group is movable along the optical axis to thereby vary the focal length while at the same time the third lens group is movable along the optical axis to thereby maintain the image position constant. The fourth lens group is composed, in order from the object side, of a negative lens, a positive lens, at least one negative lens and at least one positive lens. The zoom lens satisfies the conditions:

$$0.35 f_W \leq |f_2| < 0.55 f_W \text{ with } f_2 < 0, \quad (1)$$

$$2.0 \leq f_0/f_{123} \leq 3.0, \quad (2)$$

$$1.70 \leq N_L, \quad (3)$$

and $$3f_4 \leq R_L \leq f_4 \text{ with } R_L < 0 \quad (4)$$

where $f_W$ is the minimum focal length of the overall lens system, $f_2$ is the focal length of the second lens group, $f_0$ is the overall focal length, $f_{123}$ is the resultant focal length of the first, second and third lens groups when the overall focal length is $f_0$, $f_4$ is the focal length of the fourth lens group, $N_L$ is the refractive index of the first negative lens of the fourth lens group, and $R_L$ is the radius of curvature of the object side lens surface of the first negative lens of the fourth lens group.

The reasons for these conditions will now be described. Condition (1) is required to shorten the overall lens length and to minimize the various aberrations over the zoom range. That is, the second lens group serves to vary the overall focal length and it is general that the greater the refractive power, the shorter the movement needed for obtaining the predetermined variation ratio becomes. For this reason, it is a relatively simple matter to reduce the overall length. However, when the refractive power is increased, various aberrations tend to occur. In particular, since the second lens group is movable, the second lens group causes variations in aberrations within the overall zoom range. The condition (1) is used to balance the above-described two tendencies. Below the lower limit, although compactness is thus provided, it is difficult to maintain the various aberrations within acceptable bounds over the zoom range. Inversely, above the upper limit, although good aberration balance is obtained, it is impossible to reduce the overall length of the lens.

Condition (2) is also required to miniaturize the lens system and is important for the present invention.

To form a fixed focus telephoto lens, a so-called telephoto type lens is substantially divided into a front lens group having a positive refractive power and a rear lens group having a negative refractive power. It is well known that the stronger the refractive power of the front lens group, that is, the shorter the focal length of the front lens group in comparison with the overall focal length, the more compact will be the lens.

This theory is applied to the zoom lens of the present invention. A negative refractive power is imposed on the fourth lens group which is effectively a "master section" and the composite section composed of the first to third lens groups is regarded as the front lens group of the telephoto type lens and a strong positive power is imposed thereto so that the composite zoom lens is miniaturized.

When the upper limit of condition (2) is exceeded, the refractive power of the resultant lens group composed of the first, second and third lens groups, which is regarded as the front lens group, is three times or more the refractive power of the overall lens system. As a result, although the zoom lens system may be compact, the refractive power thereof is too strong. Therefore, compensation for spherical aberration and astigmatism is insufficient. To compensate for these aberrations, the refractive power of the fourth lens group must be increased. At the same time, high order aberrations are generated which is unsuitable for aberration balance. Inversely, when the lower limit is exceeded, it is very easy to correct the aberrations but miniaturization of the composite zoom lens, which is a primary object of the present invention, is not attainable.

Conditions (3) and (4) concern the first negative lens of the fourth lens group. Since the first to third lens groups, which are so constructed as to satisfy conditions (1) and (2), have as strong a positive refractive power as the resultant lens group, spherical aberration and astigmatism which are not sufficiently corrected are present to some extent. In order to compensate for these aberrations, a negative lens which has a relatively strong refractive power is required for the first lens of the fourth lens group. When optical glass material which satisfies condition (3) is used as the above-described negative lens, the radii of curvature of both lens surfaces thereof must be decreased in terms of absolute values so that high order excessive compensation aberrations are generated making it difficult to correct the aberrations with a good balance.

Condition (4) concerns the radius of curvature of the surface of the above-described negative lens on the object side. When the lower limit is exceeded, $R_L$ is too small, an excessive load is imposed on the image side lens surface so that the various aberrations cannot be well corrected. Inversely, when the upper limit is exceeded, $R_L$ is too great so that excessively corrected aberrations are generated on the side lens surface causing a deterioration in performance.

The above-described conditions are satisfied with the lens system constructed within the limits discussed above as a result of which a very compact telephoto zoom lens having a relatively large aperture and a good performance is provided. It is, however, preferable to further satisfy the following conditions to provide much greater aberration compensation for the zoom lens.

Namely, the zoom lens in this case includes, in order from the object side, a first lens group having a positive refractive power and having two biconvex lenses at least one of which has an Abbe number of 60 or more, and a cemented lens composed of a negative lens and a positive lens, the cemented convex surface being directed to the object, a second lens group having a negative refractive power and having a single negative lens and a cemented lens composed of a positive lens and a negative lens, a third lens group having a positive refractive power and having a single positive lens and two cemented lenses each composed of a positive lens and a negative lens, and a fourth lens group having a negative refractive power and having a single negative lens and a single positive lens. The fourth lens group includes thereafter at least one negative lens and at least one positive lens. The first lens group is movable for focusing, and the second lens group is movable along the optical axis to thereby vary the focal length while at the same time the third lens group is movable along the optical axis in order to maintain the image position constant. The zoom lens satisfies the following conditions:

$$\nu_{2N} - \nu_{2P} \geq 25, \qquad (a)$$

$$\nu_{3P} - \nu_{3N} \geq 15, \qquad (b)$$

$$|\nu_{2P} - \nu_{3N}| \leq 10, \qquad (c)$$

$$N_{4P} \leq 1.70, \qquad (d)$$

and $$N_{4N} \geq 1.70, \qquad (e)$$

where $\nu_{iP}$ is the Abbe number of any positive lens in the i-th lens group, $\nu_{iN}$ is the Abbe number of any negative lens in the i-th lens group, $N_{4P}$ is the refractive index of any positive lens in the fourth lens group, and $N_{4N}$ is the refractive index of any negative lens in the fourth lens group.

It is desirable that, since the first lens group is movable for focusing, the aberration coefficients be made as small as possible so as to reduce the variation of aberration caused by variations of the object distance. The reduction of the aberration coefficients of the first lens group is also effective for reduction of the load imposed on the lens groups after the second lens group for aberration compensation.

Since the first lens group is composed of two convex lenses and a cemented lens made up of a negative lens and a positive lens, the above noted effect is obtained. That is, it is possible to lengthen the radius of curvature of each lens surface by distributing the refractive power to the two biconcave lenses so that the aberration coefficients of the entire first lens group are reduced.

Regarding aberration compensation for chromatic aberration effects on the performance, particularly at the telephoto end, since the aberrations generated in the first lens group are amplified after the second lens group, it is important to reduce the chromatic aberration generated in the first lens group to the minimum possible value as for the other aberrations. For this reason, if the Abbe number of at least one lens of the two biconvex lenses included in the first lens group is not 60 or more, it is impossible to compensate for the chromatic aberration suitably.

Condition (a) is required to obtain an achromatic effect with the second lens group. Deviating from this condition, the radius of curvature of the cemented lens surface must be decreased in its absolute value for the achromatic effect. Since the end thickness of the positive lenses must be maintained suitably, the thickness at the optical axis is increased which is undesirable for miniaturization. Also, since high order aberrations are generated by increasing the curvature, it is difficult to maintain the aberrations in good balance over the entire zoom range.

Condition (b) is required to attain the achromatic effect at the third lens group. Deviating from the set condition, the radius of curvature of the cemented lens surface must be decreased in absolute value for the achromatic effect. Therefore, since high order aberrations are generated, it is difficult to balance the aberrations, particularly around the focal length at which rays of light pass through a high portion of the third lens group.

Condition (c) is required to highly compensate for the chromatic aberration in the overall lens system in cooperation with conditions (a) and (b).

Conditions (d) and (e) concern the refractive index of the lenses in the fourth lens group.

In a telephoto zoom lens having a relatively large aperture as in the present invention, if the overall length is reduced, the Petzval's sum will be too small and the image curvature distortion is quite significant. Therefore, it is difficult to obtain good performance over the entire zoom range. Since the zoom lens according to the present invention has a relatively large Petzval's sum of the resultant group of the first to third lens groups, it is necessary to construct the lens so that the Petzval's sum is not reduced by the fourth lens group having a negative refractive power. This is realized by using optical material which provides the positive lenses with low refractive indices while the negative lenses having high refractive indices satisfying conditions (d) and (e).

Furthermore, it is possible that the fourth lens group be composed, in order from the object side, of a negative lens, a positive lens, a single negative lens and a single positive lens. However, in case positive distortion is generated due to the compactness of the lens system, it is possible to obtain much higher performance by arranging a pair of negative and positive lenses having weak refractive powers near the image surface.

Specific Examples of lenses constructed according to the present invention will be described in which f is the focal length, R is the radius of curvature, D is the thickness on the optical axis or the spacing between lenses, N is the refractive index at the d-line, and $\nu$ is the Abbe number of the lens.

EXAMPLE 1

| | F = 186.0 ~ 390.0 | | $F_{NO} = 4.50$ | | |
|---|---|---|---|---|---|
| | R | D | | | |
| 1 | 216.203 | 11.00 | $N_1$ | 1.48749 $\nu_1$ | 70.1 |
| 2 | −368.288 | 0.10 | | | |
| 3 | 210.000 | 11.55 | $N_2$ | 1.48749 $\nu_2$ | 70.1 |
| 4 | −300.000 | 1.05 | | | |
| 5 | −289.670 | 8.22 | $N_3$ | 1.77250 $\nu_3$ | 49.6 |
| 6 | 159.718 | 9.50 | $N_4$ | 1.48749 $\nu_4$ | 70.1 |
| 7 | ∞ | Variable | | | |
| 8 | 2539.340 | 6.50 | $N_5$ | 1.61800 $\nu_5$ | 63.4 |
| 9 | 140.152 | 9.24 | | | |
| 10 | −102.000 | 9.76 | $N_6$ | 1.80518 $\nu_6$ | 25.4 |
| 11 | −62.234 | 2.89 | $N_7$ | 1.61800 $\nu_7$ | 63.4 |
| 12 | 636.576 | Variable | | | |
| 13 | 400.000 | 7.09 | $N_8$ | 1.61800 $\nu_8$ | 63.4 |
| 14 | −117.000 | 0.10 | | | |
| 15 | 89.240 | 11.82 | $N_9$ | 1.64328 $\nu_9$ | 47.9 |
| 16 | −89.240 | 2.99 | $N_{10}$ | 1.74077 $\nu_{10}$ | 27.8 |
| 17 | −2221.231 | 0.10 | | | |
| 18 | 54.000 | 8.25 | $N_{11}$ | 1.61800 $\nu_{11}$ | 63.4 |
| 19 | 921.767 | 2.68 | $N_{12}$ | 1.68893 $\nu_{12}$ | 31.1 |
| 20 | 48.800 | Variable | | | |
| 21 | −155.000 | 2.49 | $N_{13}$ | 1.81600 $\nu_{13}$ | 46.6 |
| 22 | 89.373 | 0.10 | | | |
| 23 | 39.688 | 6.06 | $N_{14}$ | 1.61293 $\nu_{14}$ | 37.0 |
| 24 | 199.610 | 16.27 | | | |
| 25 | 189.738 | 2.22 | $N_{15}$ | 1.83481 $\nu_{15}$ | 42.7 |
| 26 | 29.702 | 1.26 | | | |
| 27 | 34.227 | 4.27 | $N_{16}$ | 1.67270 $\nu_{16}$ | 32.1 |
| 28 | 328.301 | 71.17 | | | |
| 29 | −46.966 | 3.40 | $N_{17}$ | 1.83481 $\nu_{17}$ | 42.7 |
| 30 | −85.000 | 2.38 | | | |
| 31 | 75.123 | 4.50 | $N_{18}$ | 1.61293 $\nu_{18}$ | 37.0 |
| 32 | 317.405 | | | | |

| Variable Distances | | | |
|---|---|---|---|
| f | 186.0 | 270.0 | 390.0 |
| $d_7$ | 1.85 | 34.37 | 67.16 |
| $d_{12}$ | 76.02 | 37.98 | 1.94 |
| $d_{20}$ | 8.39 | 13.91 | 17.17 |

$|f_2| = 98.83 = 0.53 f_W$
$f_0/f_{123} = 2.19$
$N_L = 1.81600$
$R_L = -155.0 = 1.42 f_4$

EXAMPLE 2

| | f = 185 ~ 390 | | $F_{NO} = 5.60$ | | |
|---|---|---|---|---|---|
| 1 | 260.000 | 7.00 | $N_1$ | 1.48749 $\nu_1$ | 70.1 |
| 2 | −260.000 | 0.10 | | | |
| 3 | 131.000 | 8.80 | $N_2$ | 1.49700 $\nu_2$ | 81.3 |
| 4 | −294.907 | 1.09 | | | |
| 5 | −289.338 | 3.55 | $N_3$ | 1.77250 $\nu_3$ | 49.6 |
| 6 | 112.942 | 6.99 | $N_4$ | 1.48749 $\nu_4$ | 70.1 |
| 7 | ∞ | Variable | | | |
| 8 | −550.000 | 2.65 | $N_5$ | 1.61800 $\nu_5$ | 63.4 |
| 9 | 137.272 | 5.31 | | | |
| 10 | −92.741 | 3.94 | $N_6$ | 1.80518 $\nu_6$ | 25.4 |
| 11 | −51.000 | 2.45 | $N_7$ | 1.61800 $\nu_7$ | 63.4 |
| 12 | 762.000 | Variable | | | |
| 13 | 900.000 | 4.94 | $N_8$ | 1.61800 $\nu_8$ | 63.4 |
| 14 | −100.422 | 0.10 | | | |
| 15 | 93.720 | 8.25 | $N_9$ | 1.62230 $\nu_9$ | 53.2 |
| 16 | −71.000 | 2.50 | $N_{10}$ | 1.80518 $\nu_{10}$ | 25.4 |
| 17 | −263.618 | 0.10 | | | |
| 18 | 50.501 | 4.74 | $N_{11}$ | 1.61800 $\nu_{11}$ | 63.4 |
| 19 | 118.000 | 2.47 | $N_{12}$ | 1.66680 $\nu_{12}$ | 33.0 |
| 20 | 47.175 | Variable | | | |
| 21 | −150.000 | 2.00 | $N_{13}$ | 1.77250 $\nu_{13}$ | 49.6 |
| 22 | 93.000 | 0.10 | | | |
| 23 | 44.100 | 4.70 | $N_{14}$ | 1.63636 $\nu_{14}$ | 35.4 |
| 24 | 166.607 | 40.34 | | | |
| 25 | 696.315 | 2.40 | $N_{15}$ | 1.83481 $\nu_{15}$ | 42.7 |
| 26 | 32.889 | 0.95 | | | |
| 27 | 37.300 | 2.75 | $N_{16}$ | 1.64769 $\nu_{16}$ | 33.8 |
| 28 | −792.000 | 40.94 | | | |
| 29 | −35.750 | 2.88 | $N_{17}$ | 1.83481 $\nu_{17}$ | 42.7 |
| 30 | −94.500 | 0.87 | | | |
| 31 | 118.500 | 3.75 | $N_{18}$ | 1.62588 $\nu_{18}$ | 35.7 |
| 32 | −118.500 | | | | |

| Variable Distances | | | |
|---|---|---|---|
| f | 185.0 | 280.0 | 390.0 |
| $d_7$ | 2.33 | 36.01 | 73.04 |
| $d_{12}$ | 67.70 | 31.02 | 1.53 |
| $d_{20}$ | 10.61 | 13.61 | 6.07 |

$|f_2| = 86.48 = 0.46 f_W$
$f_0/f_{123} = 2.31$
$N_L = 1.7725$
$R_L = -150.0 = 1.97 f_4$

What is claimed is:

1. A zoom lens system comprising, in order from the object side, a first lens group having a positive refractive power, a second lens group having a negative refractive power, a third lens group having a positive refractive power and a fourth lens group having a negative refractive power, wherein the second lens group is movable along the optical axis to thereby vary the focal length of the zoom lens system and the third lens group is movable along the optical axis to thereby maintain the image position constant, and the fourth lens group is composed, in order from the object side, of a negative lens, a positive lens, at least one negative lens, and at least one positive lens, the zoom lens system satisfying:

| | F = 186.0 ~ 390.0 | | $F_{NO}$ = 4.50 | | |
|---|---|---|---|---|---|
| | R | D | | | |
| 1 | 216.203 | 11.00 | $N_1$ 1.48749 | $\nu_1$ | 70.1 |
| 2 | −368.288 | 0.10 | | | |
| 3 | 210.000 | 11.55 | $N_2$ 1.48749 | $\nu_2$ | 70.1 |
| 4 | −300.000 | 1.05 | | | |
| 5 | −289.670 | 8.22 | $N_3$ 1.77250 | $\nu_3$ | 49.6 |
| 6 | 159.718 | 9.50 | $N_4$ 1.48749 | $\nu_4$ | 70.1 |
| 7 | ∞ | Variable | | | |
| 8 | 2539.340 | 6.50 | $N_5$ 1.61800 | $\nu_5$ | 63.4 |
| 9 | 140.152 | 9.24 | | | |
| 10 | −102.000 | 9.76 | $N_6$ 1.80518 | $\nu_6$ | 25.4 |
| 11 | −62.234 | 2.89 | $N_7$ 1.61800 | $\nu_7$ | 63.4 |
| 12 | 636.576 | Variable | | | |
| 13 | 400.000 | 7.09 | $N_8$ 1.61800 | $\nu_8$ | 63.4 |
| 14 | −117.000 | 0.10 | | | |
| 15 | 89.240 | 11.82 | $N_9$ 1.64328 | $\nu_9$ | 47.9 |
| 16 | −89.240 | 2.99 | $N_{10}$ 1.74077 | $\nu_{10}$ | 27.8 |
| 17 | −2221.231 | 0.10 | | | |
| 18 | 54.000 | 8.25 | $N_{11}$ 1.61800 | $\nu_{11}$ | 63.4 |
| 19 | 921.767 | 2.68 | $N_{12}$ 1.68893 | $\nu_{12}$ | 31.1 |
| 20 | 48.800 | Variable | | | |
| 21 | −155.000 | 2.49 | $N_{13}$ 1.81600 | $\nu_{13}$ | 46.6 |
| 22 | 89.373 | 0.10 | | | |
| 23 | 39.688 | 6.06 | $N_{14}$ 1.61293 | $\nu_{14}$ | 37.0 |
| 24 | 199.610 | 16.27 | | | |
| 25 | 189.738 | 2.22 | $N_{15}$ 1.83481 | $\nu_{15}$ | 42.7 |
| 26 | 29.702 | 1.26 | | | |
| 27 | 34.227 | 4.27 | $N_{16}$ 1.67270 | $\nu_{16}$ | 32.1 |
| 28 | 328.301 | 71.17 | | | |
| 29 | −46.966 | 3.40 | $N_{17}$ 1.83481 | $\nu_{17}$ | 42.7 |
| 30 | −85.000 | 2.38 | | | |
| 31 | 75.123 | 4.50 | $N_{18}$ 1.61293 | $\nu_{18}$ | 37.0 |
| 32 | 317.405 | | | | |

| Variable Distances | | | |
|---|---|---|---|
| f | 186.0 | 270.0 | 390.0 |
| $d_7$ | 1.85 | 34.37 | 67.16 |
| $d_{12}$ | 76.02 | 37.98 | 1.94 |
| $d_{20}$ | 8.39 | 13.91 | 17.17 |

$|f_2| = 98.83 = 0.53 f_W$
$f_0/f_{123} = 2.19$
$N_L = 1.81600$
$R_L = -155.0 = 1.42 f_4$ wherein f is the focal length, R is the radius of curvature, D is the thickness on the optical axis and the spacing between lenses, N is the refractive index at the d-line, and $\nu$ is the Abbe number of the corresponding lens.

2. A zoom lens system comprising, in order from the object side, a first lens group having a positive refractive power, a second lens group having a negative refractive power, a third lens group having a positive refractive power and a fourth lens group having a negative refractive power, wherein the second lens group is movable along the optical axis to thereby vary the focal length of the zoom lens system and the third lens group is movable along the optical axis to thereby maintain the image position constant, and the fourth lens group is composed, in order from the object side, of a negative lens, a positive lens, at least one negative lens, and at least one positive lens, the zoom lens system satisfying:

| | f = 185 ~ 390 | | $F_{NO}$ = 5.60 | | |
|---|---|---|---|---|---|
| 1 | 260.000 | 7.00 | $N_1$ 1.48749 | $\nu_1$ | 70.1 |
| 2 | −260.000 | 0.10 | | | |
| 3 | 131.000 | 8.80 | $N_2$ 1.49700 | $\nu_2$ | 81.3 |
| 4 | −294.907 | 1.09 | | | |
| 5 | −289.338 | 3.55 | $N_3$ 1.77250 | $\nu_3$ | 49.6 |
| 6 | 112.942 | 6.99 | $N_4$ 1.48749 | $\nu_4$ | 70.1 |
| 7 | ∞ | Variable | | | |
| 8 | −550.000 | 2.65 | $N_5$ 1.61800 | $\nu_5$ | 63.4 |
| 9 | 137.272 | 5.31 | | | |
| 10 | −92.741 | 3.94 | $N_6$ 1.80518 | $\nu_6$ | 25.4 |
| 11 | −51.000 | 2.45 | $N_7$ 1.61800 | $\nu_7$ | 63.4 |
| 12 | 762.000 | Variable | | | |
| 13 | 900.000 | 4.94 | $N_8$ 1.61800 | $\nu_8$ | 63.4 |
| 14 | −100.422 | 0.10 | | | |
| 15 | 93.720 | 8.25 | $N_9$ 1.62230 | $\nu_9$ | 53.2 |
| 16 | −71.000 | 2.50 | $N_{10}$ 1.80518 | $\nu_{10}$ | 25.4 |
| 17 | −263.618 | 0.10 | | | |
| 18 | 50.501 | 4.74 | $N_{11}$ 1.61800 | $\nu_{11}$ | 63.4 |
| 19 | 118.000 | 2.47 | $N_{12}$ 1.66680 | $\nu_{12}$ | 33.0 |
| 20 | 47.175 | Variable | | | |
| 21 | −150.000 | 2.00 | $N_{13}$ 1.77250 | $\nu_{13}$ | 49.6 |
| 22 | 93.000 | 0.10 | | | |
| 23 | 44.100 | 4.70 | $N_{14}$ 1.63636 | $\nu_{14}$ | 35.4 |
| 24 | 166.607 | 40.34 | | | |
| 25 | 696.315 | 2.40 | $N_{15}$ 1.83481 | $\nu_{15}$ | 42.7 |
| 26 | 32.889 | 0.95 | | | |
| 27 | 37.300 | 2.75 | $N_{16}$ 1.64769 | $\nu_{16}$ | 33.8 |
| 28 | −792.000 | 40.94 | | | |
| 29 | −35.750 | 2.88 | $N_{17}$ 1.83481 | $\nu_{17}$ | 42.7 |
| 30 | −94.500 | 0.87 | | | |
| 31 | 118.500 | 3.75 | $N_{18}$ 1.62588 | $\nu_{18}$ | 35.7 |
| 32 | −118.500 | | | | |

| Variable Distances | | | |
|---|---|---|---|
| f | 185.0 | 280.0 | 390.0 |
| $d_7$ | 2.33 | 36.01 | 73.04 |
| $d_{12}$ | 67.70 | 31.02 | 1.53 |
| $d_{20}$ | 10.61 | 13.61 | 6.07 |

$|f_2| = 86.48 = 0.46 f_W$
$f_0/f_{123} = 2.31$
$N_L = 1.7725$
$R_L = -150.0 = 1.97 f_4$ wherein f is the focal length, R is the radius of curvature, D is the thickness on the optical axis and the spacing between lenses, N is the refractive index at the d-line, and $\nu$ is the Abbe number of the corresponding lens.

* * * * *